(12) United States Patent
Szuscik-Machnicki et al.

(10) Patent No.: US 9,850,385 B2
(45) Date of Patent: Dec. 26, 2017

(54) PARTICLE AND COMPOSITION OF PARTICLES WITH CONTROLLED DIMENSIONS

(71) Applicant: Andrew Henry Szuscik-Machnicki, Ealing, London (GB)

(72) Inventors: Andrew Henry Szuscik-Machnicki, London (GB); Mark Edward Dawes, Middlesbrough (GB)

(73) Assignee: Andrew Henry Szuscik-Machnicki, London (GB)

( * ) Notice: Subject to any disclaimer, the term of this patent is extended or adjusted under 35 U.S.C. 154(b) by 0 days.

(21) Appl. No.: 14/815,730

(22) Filed: Jul. 31, 2015

(65) Prior Publication Data

US 2015/0337137 A1    Nov. 26, 2015

Related U.S. Application Data

(62) Division of application No. 12/283,000, filed as application No. PCT/GB2007/000931 on Mar. 16, 2007, now Pat. No. 9,095,899.

(30) Foreign Application Priority Data

Mar. 16, 2006    (GB) .................................. 0605360.7

(51) Int. Cl.
   *C04B 14/04*    (2006.01)
   *C09C 1/64*    (2006.01)
   (Continued)

(52) U.S. Cl.
   CPC .............. *C09C 1/64* (2013.01); *B22F 1/0055* (2013.01); *B22F 9/02* (2013.01); *C09C 1/0015* (2013.01);
   (Continued)

(58) Field of Classification Search
   None
   See application file for complete search history.

(56) References Cited

U.S. PATENT DOCUMENTS 3,689,346 A    9/1972    Rowland
4,321,087 A    3/1982    Levine et al.
(Continued)

FOREIGN PATENT DOCUMENTS

EP    0407615    1/1991
EP    0408197    1/1991
(Continued)

OTHER PUBLICATIONS

Bordogna, Joseph; Keneman, Scott A.; and Amodei, Juan J. "Recyclable Holographic Storage Media" RCA Review (Philadelphia, PA) (1972).*

*Primary Examiner* — Kaj K Olsen
*Assistant Examiner* — Ross J. Christie
(74) *Attorney, Agent, or Firm* — Knobbe Martens Olson & Bear LLP (57) ABSTRACT

A particle and a composition including a plurality of particles are provided, wherein the particles are platelets exhibiting a planar geometry which is circular or which is made up of a number (x) of planar (y)-sided polygon(s), wherein x is from 1 to 20 and y is at least 3 wherein if x is greater than 1 then said planar (y)-sided polygons are fused along one or more sides thereof, wherein the width ($W_P$) of the platelets (P) at their widest point is no more than about 250 pm and the thickness of the platelets (P) is in the range of 10 nm to 50 nm.

12 Claims, 3 Drawing Sheets

(51) Int. Cl.
*C22C 21/00* (2006.01)
*B22F 1/00* (2006.01)
*B22F 9/02* (2006.01)
*C09C 1/00* (2006.01)

(52) U.S. Cl.
CPC ............ *C09C 1/0018* (2013.01); *C22C 21/00* (2013.01); *B22F 2001/0033* (2013.01); *B22F 2001/0037* (2013.01); *B22F 2998/10* (2013.01); *C01P 2004/52* (2013.01); *C01P 2004/61* (2013.01); *C09C 2200/1004* (2013.01); *C09C 2200/1054* (2013.01); *C09C 2200/1087* (2013.01); *C09C 2200/301* (2013.01); *C09C 2210/40* (2013.01); *Y10T 428/12* (2015.01); *Y10T 428/12993* (2015.01); *Y10T 428/2982* (2015.01)

(56) References Cited

U.S. PATENT DOCUMENTS

| | | |
|---|---|---|
| 4,417,784 A | 11/1983 | Knop et al. |
| 4,537,504 A | 8/1985 | Baltes et al. |
| 4,661,983 A | 4/1987 | Knop |
| 4,758,296 A | 7/1988 | McGrew |
| 4,840,757 A | 6/1989 | Blenkhorn |
| 4,913,858 A | 4/1990 | Miekka et al. |
| 4,933,120 A | 6/1990 | D'Amato et al. |
| 5,003,915 A | 4/1991 | D'Amato et al. |
| 5,085,514 A | 2/1992 | Mallik et al. |
| 5,155,604 A | 10/1992 | Miekka et al. |
| 5,164,227 A | 11/1992 | Miekka et al. |
| 5,549,774 A | 8/1996 | Miekka et al. |
| 5,624,076 A | 4/1997 | Miekka et al. |
| 5,629,068 A | 5/1997 | Miekka et al. |
| 5,672,410 A | 9/1997 | Miekka et al. |
| 5,882,798 A | 3/1999 | Hubbard et al. |
| 5,912,767 A | 6/1999 | Lee |
| 5,925,428 A | 7/1999 | Hubbard et al. |
| 5,993,702 A | 11/1999 | Davis |
| 6,068,691 A | 5/2000 | Miekka et al. |
| 6,112,388 A | 9/2000 | Kimoto et al. |
| 6,168,100 B1 | 1/2001 | Kato et al. |
| 6,212,510 B1 | 4/2001 | Brand |
| 6,351,537 B1 * | 2/2002 | Dovgodko ............. G06K 19/16 380/54 |
| 6,692,830 B2 | 2/2004 | Argoitia et al. |
| 6,737,154 B2 | 5/2004 | Jonza et al. |
| 6,749,777 B2 | 6/2004 | Argoitia et al. |
| 6,749,936 B2 | 6/2004 | Argoitia et al. |
| 6,902,807 B1 | 6/2005 | Argoitia et al. |
| 2002/0166342 A1* | 11/2002 | Themont ................ C03C 17/02 65/17.3 |
| 2003/0129301 A1* | 7/2003 | Engle .................. B41M 5/0047 427/146 |
| 2003/0179364 A1* | 9/2003 | Steenblik ............... B82Y 20/00 356/71 |
| 2005/0123755 A1 | 6/2005 | Argoitia et al. |
| 2006/0143895 A1* | 7/2006 | Liu ....................... B82Y 15/00 29/527.1 |
| 2006/0144120 A1* | 7/2006 | Tang ..................... G01M 3/007 73/1.17 |

FOREIGN PATENT DOCUMENTS

| | | |
|---|---|---|
| EP | 0540455 | 5/1993 |
| EP | 0906362 | 12/1997 |
| EP | 0978373 | 9/2000 |
| EP | 1741757 | 10/2007 |
| GB | 2027441 | 2/1980 |
| GB | 2221870 | 2/1990 |
| WO | WO 93/23481 | 11/1993 |
| WO | WO 94/18609 | 8/1998 |
| WO | WO 99/38704 | 8/1999 |
| WO | WO 03/011980 | 2/2003 |
| WO | WO 03/078512 | 9/2003 |
| WO | WO 2005/017048 | 2/2005 |
| WO | WO 2005/071497 | 8/2005 |

* cited by examiner

PARTICLE AND COMPOSITION OF PARTICLES WITH CONTROLLED DIMENSIONS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present invention relates to the manufacture of particles with controlled dimensions, particularly those having at least one embossed surface; a composition comprising such particles; and the use of such particles in inter alia paints, printing inks, spray paints, cosmetic products, high surface area ceramics or ceramic bodies, coloured plastics and optical elements or as an anti-counterfeit or security pigment.

Description of the Related Art

The preparation of embossed surfaces is well-known in the art, including the preparation of surfaces with a diffraction pattern or grating. A diffraction grating is formed when closely and regularly spaced grooves (typically 5,000 to 15,000 grooves per cm) of specified depths are embossed on a reflective surface. The diffraction grating produces an iridescent visual effect by diffracting incident light into its colour components by reflection from the grating. Thus, the viewer of the surface perceives a different colour depending on the orientation of the diffractive surface. Diffractive surfaces typically show the greatest effect under direct illumination from a controlled light source, rather than under diffuse light.

Diffraction patterns have been proposed for a variety of practical applications due to their aesthetic and utilitarian visual effects. Diffraction grating technology has been employed in the formation of two-dimensional holographic images which create the illusion of a three dimensional image to an observer, and these holographic images can form attractive displays. Information can be incorporated into and contained in the surface relief pattern of the hologram, specifically in the shape, depth, pattern and spatial frequency of the relief pattern. The images or information recorded on a hologram can be reconstructed by illuminating the surface relief pattern with light, which is diffracted and refracted by the surface relief pattern. The holographic information can be revealed under optical magnification only, if desired, or under illumination by light outside the visible spectrum. Thus, not only can diffraction and holographic patterns be used decoratively to create attractive visual effects, they can also carry images of varying size, as well as machine-readable information that function in the manner of a barcode. The use of holographic images has therefore been utilised in anti-counterfeiting applications and in security applications generally.

For the purpose of this application, the term diffraction grating includes holographic images that are based on diffraction grating technology.

The original diffraction gratings were formed by etching or scribing closely and uniformly spaced lines on polished metal surfaces. Subsequently, techniques were developed to reproduce a master diffraction grating by shaping a mouldable material against the master diffraction grating surface. More recently, thermoplastic films have been embossed by softening the surface of the films by elevated temperature and/or pressure, and passing them under stamping dies or embossing rollers in order to impart the diffraction grating or holographic image onto the softened surface. Alternatively, casting resin is coated onto a substrate web or an embossing drum prior to their surfaces coming into contact, and the resin then hardened by curing.

The original master (or parent) hologram is usually made on a photosensitive material, such as a photoresist film. The master hologram is physically delicate and is not used directly to mass-reproduce copies. Instead, a thin metal film (typically nickel) is electrodeposited on a master optical hologram in a manner which allows the surface relief pattern to be faithfully followed. Once the optical hologram and metal master are separated, a number of sub-masters are made from it. These sub-masters are then joined together in order to form a large sheet that can be wrapped around an embossing drum. The sub-master is typically referred to as the "shim", although the term "shim" is also used to refer generally to the sheet containing a plurality of sub-masters, or the embossing drum on the surface of which is disposed the plurality of sub-masters. By using a correspondingly wide drum and substrate web, many replicas of the diffraction grating or hologram can be formed across the width of the web as well as along its length. A large number of replicas of the single hologram are produced by a single revolution of the drum.

A number of patents and patent applications have described the reproduction of optically variable effect structures such as holograms and diffraction grating using in situ polymerisation replication (ISPR) techniques in which a polymer is cast or moulded against a master diffraction grating surface, typically while the polymer is held on a substrate. The embossed polymeric material may be cured, if necessary, for instance by heat and/or radiation, and the structure of the diffraction grating is retained in the material. A curing step can take place whilst the polymeric material remains in contact with the master diffraction grating, or subsequently upon removal from the mould. Examples of this approach are described in U.S. Pat. Nos. 3,689,346, 4,758,296, 4,840,757, 4,933,120, 5,003,915, 5,085,514, EP-0540455-A, EP-0407615-A and GB-2027441. WO-99/38704-A (De La Rue) describes the preparation of security devices comprising a diffraction grating structure imparted on or into a radiation-curable coating on a shrinkable substrate. WO-94/18609 (Matthiesen) describes a process in which the diffraction grating structure is imparted on or into a radiation-curable coating layer disposed on a substrate, wherein the coating is cured whilst in contact with a master mould and before removal therefrom, and wherein the master mould is transparent to the curing radiation and is located between the curable coating and the curing radiation source.

The embossed surface of certain polymeric materials is sometimes sufficiently reflective that the optical effect of the diffraction grating occurs without further processing. More typically, however, it is necessary to metallize the polymer surface.

In some applications, the useful product is the embossed polymeric material itself. The embossed polymeric film can be cut into sections, each section carrying one or more repeat pattern(s) of the holographic image(s). Individual holograms may be separated from the web supporting material, if desired. The holograms may be applied to individual object surfaces by a hot-stamping process or by cutting the individual holograms from the web and adhering them to the object surfaces. In addition to the patents referenced above, examples of such disclosures include GB-2221870-A (De La Rue) which discloses a security device comprising a substrate on or in which is provided a diffraction grating which causes incident radiation to scatter in a random manner such that the scattered beams interfere to generate a complex speckle pattern. The security device is then verified by comparing the speckle pattern with a reference. The security device may comprise, or form part of, items such as labels, identification cards, bank cards, bank notes, stamps, travel or lottery tickets or security documents. The random scattering of incident light and complex nature of the speckle pattern is reported to reduce the likelihood of forgery via reverse engineering of the security device, and is stated as advantageous over prior security device systems such as those disclosed in U.S. Pat. No. 4,537,504.

In other applications, the embossed polymeric film is itself only an intermediate in the process and acts as a medium for the transfer of the diffraction pattern to other materials. For instance, in the preparation of metallic pigments, the embossed polymeric material acts as a template onto which a metallised layer is deposited. The metallised layer is subsequently removed and comminuted into individual metallic particles each of which carry at least a part of the repeated diffraction pattern. The embossed diffractive particles can be interspersed into liquid media such as paints or inks to produce diffractive compositions for subsequent application to a variety of objects.

U.S. Pat. No. 4,321,087 (Revlon Inc.) describes a process for the production of (un-embossed) thin metallic flakes comprising the steps of depositing a metal film onto a carrier sheet coated with a release layer, removing the metal from the carrier sheet and comminuting into metallic particles. The disclosure of U.S. Pat. No. 4,321,087 was utilised in conjunction with the technology of diffraction gratings and holograms in WO-93/23481-A (Avery Dennison Corporation) which discloses a process for making thin embossed metallic flake pigment, and coating and printing formulations containing them. The embossed pattern can be a machine-readable image such as a conventional bar code image or a holographic bar code image, and the embossed flakes are useful for security applications. In the process of WO-93/23481-A, a release coating is applied to a surface of a carrier sheet, and the outer surface of the release coating is embossed or provided with a diffraction pattern. Metal vapour is condensed in the form of a thin film onto the embossed outer surface of the release coating. The carrier sheet, having the release coating and the thin metal film thereon, is then passed through a solvent system which dissolves the release coating or the carrier; allowing most of the metal film to float off the carrier sheet into the solvent without destroying the embossment on the metal film. Any residual metal film can be recovered from the carrier sheet into a non-reactive liquid medium where it is dispersed into finer pigment particles by stirring or ultrasound techniques. The metallic pigment flakes may then be concentrated and formulated as desired.

WO-03/011980 also discloses the preparation of diffractive flake pigments having a diffractive structure formed on a surface thereof, the flakes having single or multiple layers. The multiple layer flakes may comprise a symmetrical stacked coating structure on opposing sides of a reflective core layer. U.S. Pat. No. 6,242,510 discloses the production of relatively large diffractive flakes particles. U.S. Pat. No. 5,912,767 discloses particles for use in a colour-shifting security ink in which the diffractive features are arranged on the particles in a circular arrangement having a specified groove frequency in order to obtain a uniform appearance. U.S. Pat. No. 6,112,388 teaches metallic particles containing an inorganic dielectric layer. Other variations on the technology are disclosed in U.S. Pat. Nos. 6,168,100, 5,549,774, 5,629,068 and 5,672,410.

WO-2005/017048-A and EP-1741757-A disclose the preparation of pigment flakes having a selected shape and/or symbol (such as a diffraction grating pattern) embossed on a surface thereof, to provide a covert security feature to an object. The selected shape or symbol is intended to be detectable under magnification using an optical microscope. The flakes are manufactured by depositing inorganic material onto a carrier sheet at least a portion of which comprises a pattern of embossed frames optionally within which are embossed the desired symbol(s). The deposited film is then separated from the patterned sheet and processed into flake. In this prior art, the embossed portion of the carrier sheet has a plurality of frames over which the inorganic material is deposited, and from which the deposited material must be stripped and processed into flakes, which are then incorporated into a security pigment composition. However, there remains a problem with this prior art in that the stresses associated with the deposition and stripping process result in stress-cracking and random fracture of the deposited material, resulting in incomplete or inadequate production of thin flakes which replicate the desired shape of the frame embossed in the carrier sheet. The prior art process utilises a relatively thick deposited inorganic layer, and therefore relatively thick flakes, in order for the desired shape of the embossed frame to be replicated in single flakes. Moreover, a pigment flake produced by the prior art process retains around its periphery the impression of the frame-lines present in the embossed carrier sheet. These peripheral frame impressions give rise to specious reflection and/or diffraction of light from the flake surface and reduce the efficiency of the reflective surface, and therefore the flake exhibits reduced brightness in the pigment composition. In addition, such flakes do not lie flat and may impair the flow characteristics of the vehicle in which they are incorporated. Similar processes are disclosed in EP-0978373-A.

SUMMARY

It is an object of this invention to provide a process for the production of particles having controlled dimensions, particularly uniform and monodisperse particles, and particularly to provide a process which overcomes the aforementioned problems. It is a further object to provide alternative or additional controllable features on such particles so that they are suitable for use in security applications, for instance as or in a security pigment, and/or so that they exhibit optically variable effects and are suitable for use, for instance, as or in colour shift pigments (sometimes generically referred to as wavelength (or frequency) colour control pigments).

According to the present invention, there is provided a process for the preparation of particles with controlled dimensions comprising the steps of:
(i) providing a laminar substrate having a patterned surface comprising a micro-relief repeat pattern comprising one or more discrete cells, each cell consisting of a floor portion and walls having a height ($H_W$);
(ii) depositing organic or inorganic material onto the patterned surface and into the cells to provide a thickness (T) of the deposited material wherein $T \leq H_W$;
(iii) stripping the deposited organic or inorganic material from the surface of the substrate; and (iv) collecting the particles formed from said organic or inorganic material.

In one embodiment, hereinafter referred to as Embodiment A, the patterned surface of the laminar substrate is produced by thermo-embossing, in other words by subjecting an embossable substrate to elevated temperature and pressure under stamping dies or rollers which carry the repeat pattern.

In an alternative embodiment, hereinafter referred to as Embodiment B, the patterned surface of the laminar substrate is prepared by providing a laminar support layer, applying on a surface thereof a curable coating layer (preferably a radiation-curable coating layer), embossing the curable coating layer with the repeat pattern, and curing the coating layer.

Thus, the particles produced by the process replicate the cell dimensions on the patterned surface of the substrate. Thus, the particles, or platelets, produced have dimensions which correspond to the dimensions of said one or more discrete cells of the micro-relief pattern.

The process allows the provision of particles which are of controlled dimensions and exhibit a narrow particle size distribution. The dimensions of the particles are "controlled" in the sense that the particle dimensions are controllable and capable of being pre-determined, which is achieved by control of the dimensions of the discrete cells. The particle dimensions may be controlled or specified by a downstream user of the particles.

In a preferred embodiment of the process of the present invention, the repeat pattern can comprise an additional micro-relief pattern within one or more discrete cells. Thus, in this embodiment the floor portion of a cell in the patterned substrate carries an additional micro-relief pattern, such as an optically variable effect structure such as a diffraction or holographic image pattern, which is capable of carrying data or information. Thus, the additional micro-relief pattern on the patterned surface of the substrate will be transferred to the particles produced by the process. The pattern can be an image such as a logo, or a machine readable image such as a one- or two-dimensional bar-code, or an alpha-numeric sequence. The additional micro-relief pattern within a discrete cell can be the same for all discrete cells over the repeat pattern, or a plurality of additional micro-relief patterns can be provided in different cells. Alternatively, one or more additional micro-relief pattern(s) can be present in only a defined proportion of the discrete cells. For instance, when the particles produced according to the invention are used as a security pigment for the purpose of verification of authenticity of an article, some of the particles may carry an embossed pattern which is the manufacturer's logo or trademark and some of the particles may carry the date or site of production of that article or some other information. The additional micro-relief pattern can be provided simultaneously with, or prior to, the embossing of the main micro-relief repeat pattern of the discrete cells, but is preferably provided simultaneously using the same die or roller which carries on its surface a repeating pattern comprising both the discrete cell micro-relief repeat pattern and the additional micro-relief pattern.

The particles produced by the present invention which have controlled dimensions, but which carry no additional micro-relief pattern, are referred to herein as "non-encoded particles". The particles produced by the present invention which have controlled dimensions, and which do carry an additional micro-relief pattern, are referred to herein as "encoded particles".

Thus, the present invention will find utility in a number of applications, including paints, printing inks, spray paints, cosmetic products, high surface area ceramics or ceramic bodies, coloured plastics, catalysis and optical elements. Of particular interest is the manufacture of security pigments comprising the particles produced according to the process described above. The particles will find use in situations where the size distribution of particles and/or their aspect ratio is critical, for instance in the preparation of platelets of controlled size which exhibit good planar conductivity which are useful in pigments for ink-jet printing and electrically conductive pigments. A further application of particular interest is in the field of particles which are required to exhibit optically variable effects or defined optical properties; for instance, modulation or reduction of optical scatter can be achieved by modulating or minimising the particle size distribution, or controlling the aspect ratio. In addition, the particles are suitable for use as or in colour shift pigments (sometimes generically referred to as wavelength (or frequency) colour control pigments).

Reference herein to a "laminar substrate" is to an article which extends essentially in a two dimensional plane, which for the purpose of illustration may be the x-y plane, wherein the surface of the article has a micro-relief pattern, which for the purpose of illustration may be considered as extending in the z-dimension. As will be appreciated from the following description, the scale of the micro-relief pattern in the z-dimension is small in comparison with the scale of the substrate in the x and y dimensions and the overall impression of the laminar substrate to the naked eye is of a two-dimensional article.

The Repeat Pattern

A repeat pattern may contain one type of discrete cell and one type of cell geometry, or a plurality of different types of discrete cells wherein each cell type has a different geometry. In one embodiment, the repeat pattern contains only one type of cell geometry. Preferably, the cell geometries are selected from planar polygons, preferably regular planar polygons (i.e. wherein each side of the polygon is the same length), and preferably from y-sided planar polygons wherein y is 3 to 20, preferably 3 to 10, preferably 3 to 8, preferably 3 to 6, and preferably 3, 4 or 6. Thus, the cell geometry is preferably hexagonal, triangular and quadrilateral, i.e. a single geometry which can be close-packed on a planar surface without spaces. However, the present invention also encompasses non-close-packed arrangements of planar polygons. For instance, the relief pattern used in the present invention might comprise an octagonal discrete cell fused along alternating sides with four neighbouring octagonal cells, and in this arrangement the quadrilateral space defined by the planar tessellation of four octagonal cells optionally provides a further set of discrete cell geometries. Alternatively, the region(s) between the cells of a non-close-packed arrangement of planar polygons is/are not utilised to provide cell(s) for the preparation of particles of controlled dimensions, i.e. in these regions there is no relief produced in the laminar substrate by the shim. Other repeat patterns will be evident to the skilled person.

Also within the scope of the invention is the possibility that the particles of controlled dimensions are circular, and therefore that the discrete cells are also circular. Alternatively, the particles and corresponding discrete cells can be oval or have a combination of linear edges and curved edges. This embodiment is more suitable for the process of the present invention in which the cell walls define positive relief in the z-dimension as discussed hereinbelow, and less suitable for the process of the present invention in which the cell walls define negative relief in the z-dimension as discussed hereinbelow.

The repeating unit of the repeat pattern can therefore comprise:
(i) a single discrete cell optionally having an additional micro-relief pattern;
(ii) a plurality of discrete cells having the same geometry but differing in respect of the additional micro-relief pattern;
(iii) a plurality of discrete cells wherein each cell type has a different geometry, and wherein each cell optionally carries the same additional micro-relief pattern; or
(iv) a plurality of discrete cells having a plurality of different geometries, and a plurality of different (and optional) additional micro-relief patterns.

Each discrete cell consists of a floor portion and walls, which may be defined with reference to x, y and z axes wherein the x and y axes define the plane of the laminar substrate.

The floor portion of each cell extends in a plane which is substantially coplanar with (or parallel to) the plane of the laminar substrate, i.e. the floor portion extends substantially in the x and y directions defined by the plane of the laminar substrate. The cell floor may, however, be inclined relative to the x-y plane of the laminar substrate, for instance such that the angle between the plane of the cell floor and the x-y plane of the laminar substrate is in the range of from about 0° to about 20°, preferably from about 0° to about 10° and preferably from about 0° to about 5°. Preferably, a cell floor is coplanar with the x-y plane of the laminar substrate.

The walls of each cell in the micro-relief pattern generate surface relief in the z-dimension of a laminar substrate oriented in the x-y plane, and extend substantially perpendicularly to the plane of the laminar substrate. The cell walls may be tapered, i.e. the cell walls do not necessarily define a 90° angle with the cell floor and/or the x-y plane of the laminar substrate. Thus, in the embodiment in which the cell walls define positive relief in the z-dimension as defined below, the thickness of the cell wall may be greater at the base of the wall than at the top of the cell wall. In the embodiment in which the cell walls define negative relief in the z-dimension as defined below, the indentation in the laminar substrate may narrow towards the bottom of the cell wall. The angle of a cell wall to the cell floor or the x-y plane of the laminar substrate may be adjusted depending on the material deposited. Typically, the angle defined by the surface of a tapering cell wall relative to the x-y plane of the laminar substrate is not more than 110°, and is typically in the range of about 90° to 100°. Preferably, the cell walls have near-vertical faces in order to minimise or prevent any deposition of material thereon during the deposition step.

Figure 1A:
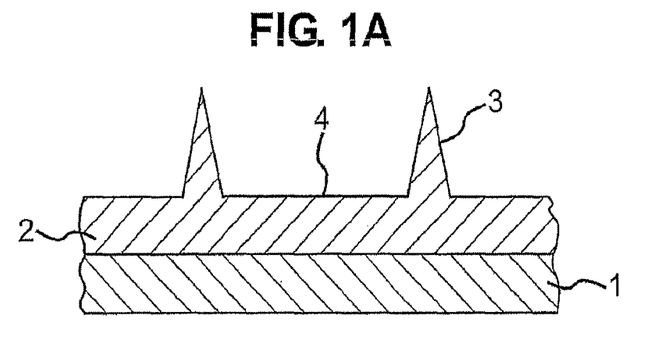
FIGS. 1A to 1C each show a laminar substrate comprising a support (1) and embossable layer (2) in which has been embossed a plurality of cells, in which each cell is defined by cell walls (3) and a cell floor (4).
Figure 1B:
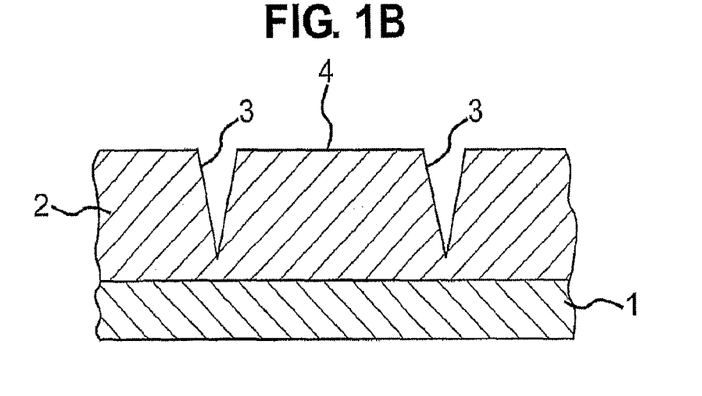
Figure 1C:
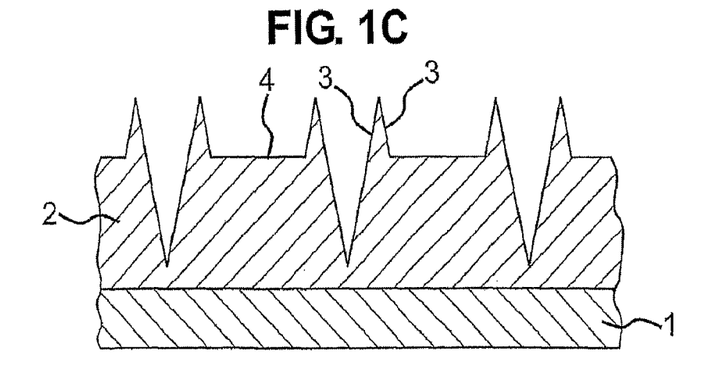
Figure 2:
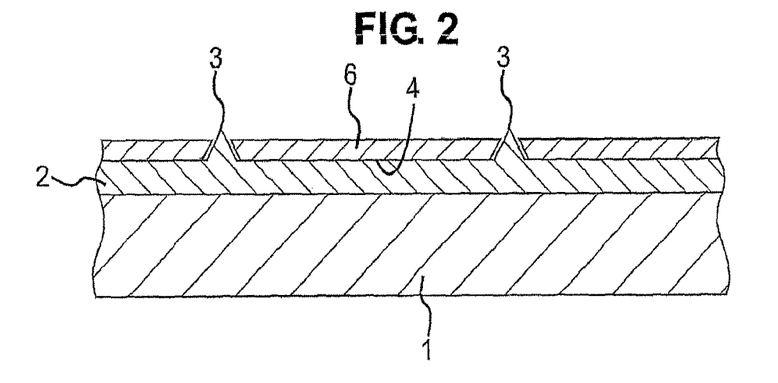
FIG. 2 shows an embossed substrate comprising a support (1) and embossable layer (2) in which has been embossed a plurality of cells, in which each cell is defined by cell walls (3) and a cell floor (4). A layer of material (6) has been deposited on the embossed substrate.

In one embodiment, the deposited material is, in effect, cast into very small moulds, as shown in FIG. 1A, and in this embodiment the cell walls define positive relief in the z-dimension such that the floor portion of the cell forms the base of a cavity around which rise the cell walls, and therefore in this embodiment the cell floor is defined by a relatively thinner cross-section of the laminar substrate in comparison to the relatively thicker cross-section of the laminar substrate which defines the walls of the cell. In an alternative embodiment, as shown in FIG. 1B, the cell walls define negative relief in the z-dimension such that the floor portion of the cell defines a plateau at the top of the cell walls, and therefore in this embodiment the cell floor is defined by a relatively thicker cross-section of the laminar substrate in comparison with the relatively thinner cross-section of the laminar substrate which defines the walls of the cell. In a further alternative, as shown in FIG. 1C, the cell walls define both positive and negative relief in the z-dimension, relative to the x-y plane of the cell floor. In each embodiment, therefore, a discrete cell comprises a domain having a boundary, the boundary being defined by substantially vertical topography surrounding the domain.

The junction of the cell floor with a cell wall preferably defines an angle in the range of from about 70° to about 130°, preferably in the range of from about 80° to about 110°, preferably in the range of from about 90° to about 110°. For instance, the surface of a non-tapering cell wall may define an angle of from about 70° to about 110° with a cell floor, depending on the inclination of the cell floor relative to the x-y plane of the laminar substrate. The surface of a tapering cell wall may define an angle of 90° to about 130° with a cell floor, depending on the inclination of the cell floor relative to the x-y plane of the laminar substrate. A cell floor which is co-planar with the laminar substrate typically defines an angle of from about 90° to about 110° with the surface of a tapering cell wall.

Typically, a discrete cell in a repeat pattern has dimensions in the x-y plane such that the width (WO of the cell floor at its widest point is no more than about 250 µm, preferably no more than about 100 µm, preferably from about 5 to about 100 µm, preferably about 5 to about 50 µm. The height ($H_W$) of the cell walls in the z-direction and relative to (i.e. above or below) the cell floor is preferably at least 100 nm, preferably at least 150 nm, and more preferably at least 200 nm. Thus, in the embodiment where the cell walls define positive relief in the z-dimension, the height of the cell walls depends on the desired thickness of the deposited material so that the platelets produced are of sufficient thickness and strength to withstand subsequent stripping and handling. Typically, the height ($H_W$) of the cell walls in the z-direction and relative to (i.e. above or below) the cell floor is no more than about 1 µm, typically no more than about 750 nm, typically no more than about 500 nm, typically no more than about 475 nm, more typically no more than about 400 nm. In one embodiment, the height ($H_W$) of the cell walls is at least 50 nm, preferably at least 100 nm, and preferably in the range of from about 150 nm to about 475 nm. In one embodiment, the height ($H_W$) of the cell walls is in the range of 10 nm to 50 nm, more preferably in the range of 15 nm to 50 nm.

In order to produce a "positive" relief pattern (as shown in FIG. 1) of the discrete cell structure on the laminar substrate having the desired dimensions, it may be necessary that the inversely corresponding "negative" relief pattern on the shim which is used to stamp out the relief pattern on the laminar substrate is manufactured with larger dimensions. Thus, in the embodiment where the discrete cells on the laminar substrate comprise walls defining positive relief in the z-direction, the corresponding negative relief pattern on the shim may need to be deeper than the desired height of the positive relief pattern of the laminar substrate. Thus, when the mouldable substrate is contacted with the shim under pressure, the mouldable material of the substrate may not necessarily penetrate into the furthest depths of the negative relief pattern on the shim, and indeed this may be desirable in some circumstances depending on the mouldable material selected. In the examples described hereinbelow, for instance, a laminar substrate having discrete cells comprising "positive-relief" walls from about 100 to about 350 nm in height can be produced by a shim in which the depth of the corresponding negative image was from about 275 to about 500 nm.

Figure 3:
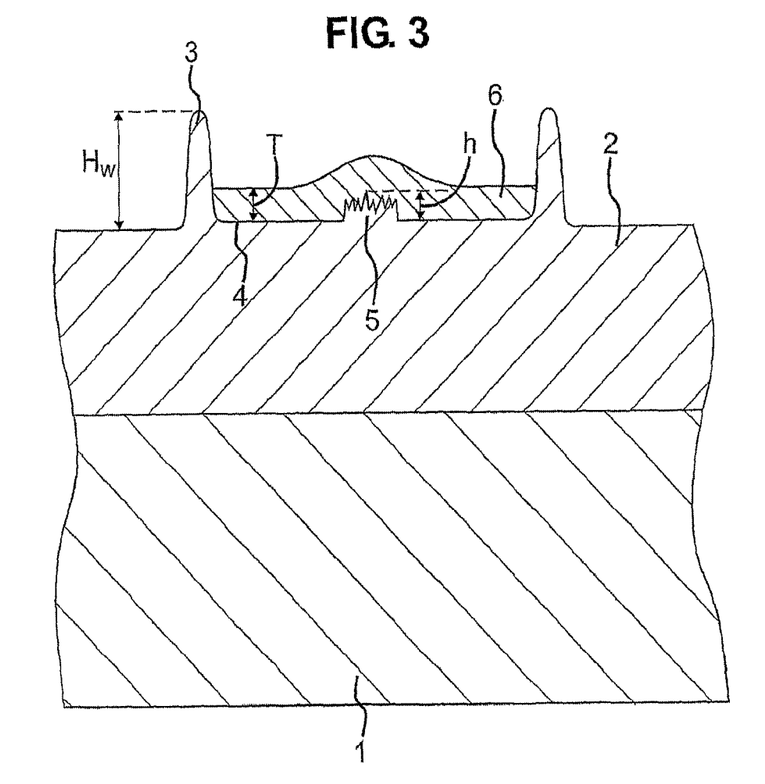
FIG. 3 shows the embodiment wherein the embossable layer (2) exhibits a plurality of cells defined by cell walls (3) of height ($H_W$) and an additional relief pattern (5) of height (h). The deposited material (6) has a thickness (T).
Figure 4:
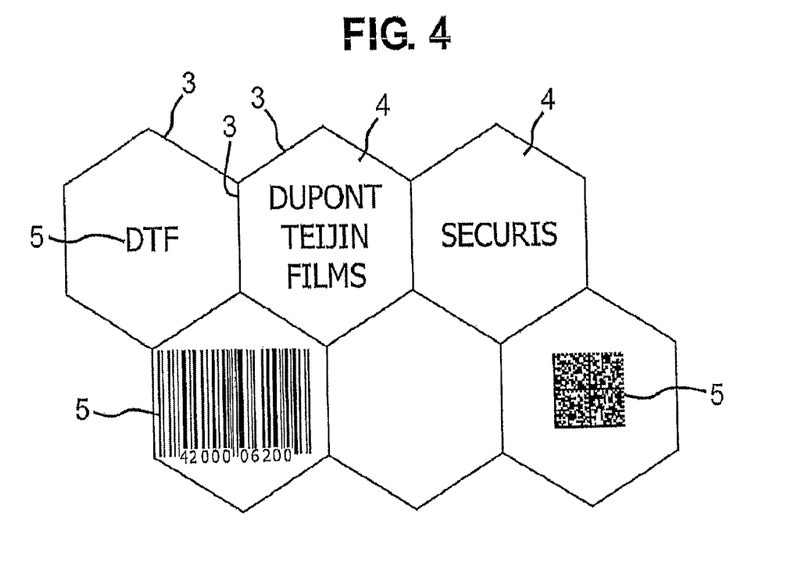
FIG. 4 shows a plan view of the surface of a patterned substrate having a repeat pattern of 6 hexagonal discrete cells of identical cell geometry having cell walls (3) and floor portions (4) comprising a plurality of different and optional micro-relief patterns (5).

The height (h) of the additional micro-relief pattern is typically from about 10 to about 80 nm, preferably from about 20 to about 60 nm, and more preferably no more than about 50 nm in the z-direction relative to the cell floor. The additional micro-relief pattern in the laminar substrate may define positive or negative relief in the z-direction, relative to the x-y plane defined by the cell floor, or a mixture of positive and negative relief. Typically, the additional micro-relief pattern defines positive relief in the cell floor, i.e. such that the additional micro-relief pattern stands proud of the cell floor (as shown in FIG. 3) and produces negative relief (i.e. indentations) in the particle. The height (h) of the additional micro-relief pattern may depend upon, for instance, the required thickness (T) and strength of the platelet particles; the cost of manufacture of the particles; and the nature of the information contained in the fine structure of the additional micro-relief pattern and the method of reading this information. In the embodiment where the cell walls define a positive relief pattern, (h) normally depends on the height ($H_W$) of the cell walls, and typically h≤$H_W$, and in one embodiment h≤(0.9$H_W$), preferably h≤(0.75$H_W$), preferably h≤(0.5$H_W$), preferably h≤(0.3$H_W$), and more preferably h≤(0.1 $H_W$), subject to the criteria noted above. Typically, the dimensions of the additional micro-relief pattern introduced into the laminar substrate are substantially the same as the corresponding negative additional micro-relief pattern on the shim, i.e. all substantially all the fine structure of the additional micro-relief pattern on the shim is transferred to the laminar substrate.

In one embodiment, the entire surface of the shim carries the desired repeat pattern, so that encoded and/or non-encoded particles of controlled dimensions can be formed across the whole width of the laminar substrate as well as along its length, and such embodiments are appropriate when all particles in a composition are required to have controlled dimensions, or when the particles of controlled dimensions are to be used as a concentrate in other formulations adapted to the desired end-use.

In a second embodiment, only part of the shim surface carries the desired repeat pattern(s), and this embodiment is of particular interest to the production of the pigment compositions of the present invention. As discussed hereinbelow, particulate compositions and formulations of the present invention may also contain "conventional" particles which do not have controlled dimensions, and these conventional particles may have a chemical composition which is the same as or different to the encoded and/or non-encoded particles of controlled dimensions described herein. The compositions and formulations of the present invention which contain conventional particles as well as encoded and/or non-encoded particles of controlled dimensions may be produced by the simple combination of the two types of particles. However, the process of the present invention may also be used as a "one-shot" process to produce particulate compositions having both conventional particles and controlled-dimension particles, in which it possible to adjust the relative concentrations of conventional and controlled-dimension particles by adjusting the surface density of discrete cells on the surface of the shim. Thus, in this second embodiment, the discrete cells described herein may be disposed only on one or more predetermined areas of the shim surface, and consequently the patterned laminar substrate produced by contact with the shim exhibits discrete cells only on a portion of its surface. The discrete cells may each be spaced apart from each other and separated by expanses of web without cells, or the discrete cells may be grouped together in one or more clusters. Thus, when the deposited organic or inorganic material is stripped from the laminar substrate as described below, the material deposited in the areas of the laminar substrate without cells produces conventional particles, whereas the material deposited in the discrete cells produces encoded or non-encoded particles of controlled dimensions, resulting in a particulate composition containing two distinct types of particles. The conventional particles may be encoded or non-encoded or a mixture thereof, independently of whether the controlled-dimension particles are encoded or non-encoded or a mixture thereof. Thus, the additional micro-relief pattern defined herein may be present not only within the discrete cells, but also in the regions of the laminar substrate (and shim) which do not exhibit discrete cells. The density of discrete cells on the shim surface, and therefore on the surface of the laminar substrate, can be adjusted depending on the desired concentration of controlled-dimension particles in the particulate composition and indeed can be stipulated by the end-user thereof. Any appropriate density can be used in, and is achievable by, the process of the present invention, but typically at least about 0.01%, preferably at least about 0.1%, preferably at least about 1%, and preferably at least 10% of the surface area of the shim and laminar substrate comprises discrete cells.

The original master of the surface relief pattern may be manufactured by any of the methods which are now well-known in the art and referred to hereinabove. Preferably, though, the master template is manufactured using electron-beam lithography, which enables the provision of very fine structure in the master template, allowing patterning with line thickness resolution as low as 1 nm and lower. This very fine structure is replicated in the sub-masters (or shims), in the patterned surface of the embossed laminar substrate, and in the additional micro-relief pattern (or diffraction gratings). This technique enables the substantially vertical walls (extending in the z-dimension) of the discrete cells to be produced with a very thin cross-section in the x-y plane of the laminar substrate. Thus, in a preferred embodiment, the substantially vertical walls of a cell occupy a total surface area (in the x-y plane of the laminar substrate) which is very small relative to the surface area of the floor portion of the cell. Preferably, at least 80% of the surface area (in the x-y plane) of the (or each) patterned portion of the laminar substrate is constituted by the floor portion(s) of the cell(s), and preferably at least 85%, preferably at least 90%, preferably at least 95%, preferably at least 98%, and preferably at least 99%.

The Substrate

The thermo-embossable substrate of Embodiment A may be formed from any material which may be moulded by the application of heat, typically in combination with pressure. Preferably, the substrate comprises a thermoplastic polymeric material. In order to be suitable, the material of an embossable surface must soften and become embossable under the influence of heat-treatment, typically at a temperature close to, and generally above, its glass transition temperature (Tg). Thermo-embossable materials are well known in the art and include, for instance, (co)polyesters, polyolefins (particularly polypropylene or polyethylene), acrylic resins, polystyrenes, cellulose acetates and PVC.

In one embodiment, the substrate is itself thermo-embossable.

In an alternative embodiment, the substrate comprises a support layer and a thermo-embossable layer disposed on a surface thereof. Typically, the thermo-embossable layer comprises a polymeric material which softens at a temperature below the temperature at which the support layer softens. Preferably, the thermo-embossable layer softens at a temperature which is at least 5° C., preferably at least 110° C., and preferably at least 15° C., and more preferably at least 20° C. below the softening temperature of the support layer. The present invention nevertheless does not exclude the use of composite substrates wherein there is partial softening of the support layer during the embossing process.

Embodiment A is described hereinbelow primarily with reference to the preferred substrate which comprises a support layer and a thermo-embossable layer. However, the skilled person will appreciate that thermo-embossable mono-layer substrates may also be used and therefore that the primary focus of the following discussion does not limit the scope of the invention.

The support layer is a self-supporting film or sheet by which is meant a film or sheet capable of independent existence in the absence of a supporting base. The support may be formed from any suitable film-forming polymer, including polyolefin (such as polyethylene and polypropylene), polycarbonate, polyamide (including nylon), PVC and polyester. In a preferred embodiment, the support is polyester, and particularly a synthetic linear polyester. Preferred polyesters may be obtained by condensing one or more dicarboxylic acids or their lower alkyl (up to 6 carbon atoms) diesters, e.g. terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid) with one or more glycols, particularly an aliphatic or cycloaliphatic glycol, e.g. ethylene glycol, 1,3-propanediol, 1,4-butanediol, neopentyl glycol and 1,4-cyclohexanedimethanol. An aromatic dicarboxylic acid is preferred. An aliphatic glycol is preferred. In a preferred embodiment, the polyester is selected from polyethylene terephthalate (PET) and polyethylene naphthalate, and is preferably PET.

The support may comprise one or more discrete layers of the above film-forming materials. The polymeric materials of the respective layers may be the same or different. For instance, the support may comprise one, two, three, four or five or more layers and typical multi-layer structures may be of the AB, ABA, ABC, ABAB, ABABA or ABCBA type. Typically, the support comprises one, two or three layers, and preferably only one layer.

Formation of the support may be effected by conventional techniques well-known in the art, and conveniently by extrusion, in accordance with the procedure described below. In general terms the process comprises the steps of extruding a layer of molten polymer, quenching the extrudate and orienting the quenched extrudate in at least one direction. The support may be uniaxially-oriented, but is preferably biaxially-oriented, as noted above. Orientation may be effected by any process known in the art for producing an oriented film, for example a tubular or flat film process. Biaxial orientation is effected by drawing in two mutually perpendicular directions in the plane of the film to achieve a satisfactory combination of mechanical and physical properties. In a tubular process, simultaneous biaxial orientation may be effected by extruding a thermoplastics polymer tube which is subsequently quenched, reheated and then expanded by internal gas pressure to induce transverse orientation, and withdrawn at a rate which will induce longitudinal orientation. In the preferred flat film process, the support-forming polymer is extruded through a slot die and rapidly quenched upon a chilled casting drum to ensure that the polymer is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, i.e. the forward direction through the film stretching machine, and then in the transverse direction. Forward stretching of the extradate is conveniently effected over a set of rotating rolls or between two pairs of nip rolls, transverse stretching then being effected in a stenter apparatus. Alternatively, the cast film may be stretched simultaneously in both the forward and transverse directions in a biaxial stenter. Stretching is effected to an extent determined by the nature of the polymer, for example polyethylene terephthalate is usually stretched so that the dimension of the oriented film is from 2 to 5, more preferably 2.5 to 4.5 times its original dimension in the or each direction of stretching. Typically, stretching is effected at temperatures in the range of 70 to 125° C. Greater draw ratios (for example, up to about 8 times) may be used if orientation in only one direction is required. It is not necessary to stretch equally in the machine and transverse directions although this is preferred if balanced properties are desired. A stretched film may be, and preferably is, dimensionally stabilised by heat-setting under dimensional restraint at a temperature above the glass transition temperature of the polymer but below the melting temperature thereof, to induce crystallisation of the polymer. The actual heat-set temperature and time will vary depending on the composition of the film but should not be selected so as to substantially degrade the mechanical properties of the film. Within these constraints, a heat-set temperature of about 135° to 250° C. is generally desirable. Preferably, the heat-set temperature is less than about 235° C., and typically less than about 225° C. Where the support comprises more than one layer, preparation of the substrate is conveniently effected by coextrusion, either by simultaneous coextrusion of the respective film-forming layers through independent orifices of a multi-orifice die, and thereafter uniting the still molten layers, or, preferably, by single-channel coextrusion in which molten streams of the respective polymers are first united within a channel leading to a die manifold, and thereafter extruded together from the die orifice under conditions of streamline flow without intermixing thereby to produce a multi-layer polymeric film, which may be oriented and heat-set as hereinbefore described. Formation of a multi-layer support may also be effected by conventional lamination techniques, for example by laminating together a preformed first layer and a preformed second layer, or by casting, for example, the first layer onto a preformed second layer.

In one embodiment, the support may be coated with a "slip coating" comprising a particulate material in order to assist in the handling of the film, for instance to improve windability and minimise or prevent "blocking". A slip coating may be applied to the reverse surface of the support, i.e. the surface opposite to the surface on which is coated the radiation-curable coating. Suitable slip coatings may comprise potassium silicate, such as that disclosed in, for example, U.S. Pat. Nos. 5,925,428 and 5,882,798, the disclosures of which is incorporated herein by reference. Alternatively, a slip coating may comprise a discontinuous layer of an acrylic and/or methacrylic polymeric resin optionally further comprising a cross-linking agent, as disclosed in, for example, EP-A-0408197, the disclosure of which is incorporated herein by reference.

In a further embodiment, the support may be coated with a primer layer to improve the adhesion of the embossable layer thereto.

The thermo-embossable layer may be formed from any suitable film-forming material, including those described hereinabove, and suitable materials for forming an thermo-embossable layer are well known in the art. Suitable materials for thermo-embossable layers include acrylic resins such as poly(methyl methacrylate) and poly(ethyl methacrylate); copolymers containing ethylene such as ethylene vinyl acetate and ethylene acrylic acid; (co)polyesters, polyolefins (particularly polypropylene or polyethylene); polystyrenes; styrene-butadiene copolymers; styrene-acrylate copolymers; cellulose acetates and PVC.

In a preferred embodiment, the thermo-embossable layer is a copolyester layer, particularly a copolyester based on PET comprising one or more further comonomers in addition to the ethylene glycol and terephthalic acid components. In one embodiment, the copolyester of the thermo-embossable layer is derived from an aliphatic glycol and at least two dicarboxylic acids, particularly aromatic dicarboxylic acids, preferably terephthalic acid and isophthalic acid. A preferred copolyester is derived from ethylene glycol, terephthalic acid and isophthalic acid. The preferred molar ratios of the terephthalic acid component to the isophthalic acid component are in the range of from 50:50 to 90:10, preferably in the range from 65:35 to 85:15. In a preferred embodiment, this copolyester is a copolyester of ethylene glycol with about 82 mole % terephthalate and about 18 mole % isophthalate. In this embodiment, the support layer is preferably PET.

In Embodiment B, the substrate comprises a support layer and an embossable layer which is a curable layer, particularly a radiation-curable layer. The desired repeat pattern is embossed into the curable coating layer which is then cured, the repeat pattern being retained in the cured coating layer. The support layer in Embodiment B is as described for Embodiment A.

The curable material is preferably a radiation-curable material, which in one embodiment, is selected from:
(a) free-radical cure resins which are unsaturated resins or monomers, prepolymers, oligomers etc., and typically containing vinyl or acrylate unsaturations which crosslink through use of a photo initiator activated by a radiation source; and
(b) cationic cure resins (e.g. epoxy resins) in which ring opening is effected using photo initiators or catalysts to generate ionic entities under a radiation source or electron beam, followed by intermolecular cross-linking.

The above resins are curable at relatively low temperatures (less than 50° C.) or even ambient temperatures while operating at realistic production speed and therefore reduce the risk of damage to the surface structure by avoiding local overheating attack or stress. These resins can also be used as thin layers and provide efficient conversion of radiation energy to heat.

The radiation used to effect curing is typically ultraviolet (UV) radiation but could comprise electron beam, visible, infra-red or higher wavelength radiation, depending upon the material, its absorbance and the process used.

The support layer and/or embossable layer may contain any of the additives conventionally employed in the manufacture of polymeric films, such as voiding agents, lubricants, anti-oxidants, radical scavengers, UV absorbers, fire retardants, thermal stabilisers, anti-blocking agents, surface active agents, slip aids, optical brighteners, gloss improvers, viscosity modifiers and dispersion stabilisers. Fillers are particularly common additives for polymeric film and useful in modulating film characteristics, as is well-known in the art. Typical fillers include particulate inorganic fillers (such as metal or metalloid oxides, clays and alkaline metal salts, such as the carbonates and sulphates of calcium and barium) or incompatible resin fillers (such as polyamides and polyolefins, in a polyester film base) or a mixture of two or more such fillers, as are well-known in the art and described in WO-03/078512-A for example. The components of the composition of a layer may be mixed together in a conventional manner. For example, by mixing with the monomeric reactants from which the layer polymer is derived, or the components may be mixed with the polymer by tumble or dry blending or by compounding in an extruder, followed by cooling and, usually, comminution into granules or chips. Masterbatching technology may also be employed.

Figure 5:
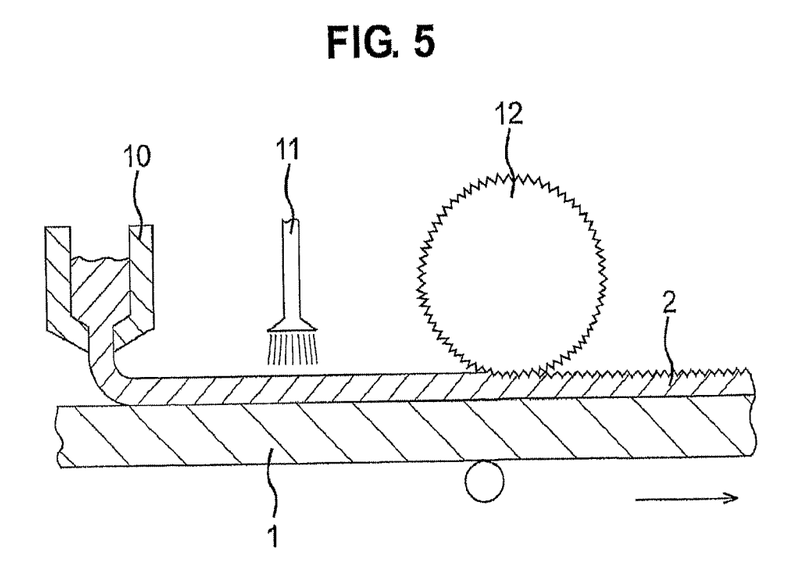
FIG. 5 shows an embodiment wherein the embossable layer (2), for instance an acrylic thermo-embossable layer, is applied to the support (1) from a storage and supply means (10), the composite (coated) substrate then being provided with a release coating (not shown) by applicator (11) prior to contact with the embossing roller (12).

The composite film comprising support and embossable layer may be prepared as described above and conveniently by coextrusion, which is particularly suitable for the substrate comprising a support and a thermo-embossable layer according to Embodiment A described herein. Alternatively, an embossable layer may be applied to the support using any other suitable technique known in the art, for instance by coating the embossable layer onto the support according to conventional techniques well-known in the art, including gravure coating (direct or indirect), slot-die coating and extrusion coating or melt coating techniques, the most appropriate method depending on the identity and characteristics of the material of the embossable layer. In one embodiment, the embossable layer is coated onto the support in the same in-line process as the embossing step, and prior to contact between the substrate and the embossing means (as shown, for instance, in FIG. 5). In a further embodiment, the embossable layer may be applied to the shim and contacted with the support as the support passes over the surface of the shim, thereby effecting adhesion between the support and an embossable layer carrying the desired repeat pattern, and this embodiment is particularly of interest to Embodiment B in which the substrate comprises a support and a curable layer. Lamination techniques may also be used to prepare the composite film comprising support and embossable layer.

The substrate, or the support layer where the substrate comprises a support and an embossable layer, is suitably of a thickness from about 5 to 350 µm, preferably from 10 to about 200 µm, more preferably from about 12 to about 100 µm, more preferably from about 12 to about 50 µm, and particularly from about 12 to about 30 µm.

The thickness, prior to embossing, of an embossable layer in the composite film referred to hereinabove and further comprising a support, is typically in the range of from about 0.5 to about 50 nm, preferably from about 1 to about 25 µm, and more preferably from about 1 to about 10 µm. The preferred thickness of an embossed layer in the areas of the cell floor where there is no additional micro-relief pattern is similarly in the range of from about 0.5 to about 50 µm, as set out above.

Release Coating

The process of the invention optionally further comprises the provision of a release coating (preferably a continuous release coating) on to at least one surface of the substrate, prior to the deposition of the organic or inorganic material, and in this embodiment the outer surface of the release coating also carries the repeat pattern. The function of a release coating is to facilitate the removal of the deposited material from the embossed substrate during the stripping process.

In some instances, a release coating is not necessary because the deposited material is readily separable from the embossed substrate by chemical or physical means, and the deposited material is applied directly to the embossed substrate. In this embodiment the substrate may comprise a support and embossable layer on or into which the repeat pattern is introduced, wherein the embossable layer optionally comprises an additional component which enhances the release properties thereof, and such components are well known in the art. Suitable release-enhancing components include, for instance, siloxanes such as hydroxylated polysiloxanes (as disclosed for instance in U.S. Pat. No. 4,913,858). Alternatively, the substrate does not comprise an embossable layer, and displays sufficient embossability and release properties without farther layers, and in that case the substrate optionally comprises a release-enhancing component.

More typically, however, a separate release coating is desirable to enable satisfactory removal and particle formation of the deposited material. A release coating may be applied to the embossable substrate as an additional coating layer via application to the surface of the embossing means prior to contact of the embossing means with the substrate. In a less-preferred alternative embodiment, the release coating may be applied subsequently to the formation of the embossed substrate, and in this instance the release coating is selected from liquids which form a uniform layer over the embossed substrate and which follow the contours of the embossment. Most preferably, however, a release coating is applied to the embossable substrate prior to contact between the embossing means and the substrate. In this preferred embodiment, and where the embossable substrate comprises a support and an embossable layer which is coated onto the support, the embossable layer and release layer may be coated onto the support in a two-stage coating process, or alternatively the embossable layer and release layer may be coated onto the support in a one-stage coating process using a double-head coating apparatus, and preferably these coating processes are conducted "in-line" during manufacture of the composite film substrate, and preferably at the inter-draw stage (i.e. between the forward and sideways stretching steps of a biaxially oriented film manufacturing process). Similarly, where the embossable substrate comprises a coextruded support and embossable layer, the release coating is preferably applied in-line during manufacture of the composite film substrate, and preferably at the inter-draw stage.

In a first embodiment, a release coating may be one which is dissolvable or strippable from the substrate by a solvent, and such release coatings are generally referred to as "strippable coatings", and these are the preferred release coatings in the processes described herein.

In a second embodiment, the release coating remains on the substrate after removal of the deposited organic or inorganic particulate material. Such coatings typically exhibit low interfacial adhesion to the subsequently deposited layer. Such "surface-energy type" release coatings are well known in the art, and include silicones, waxes, soaps and fluorocarbon-based materials. Alternatively, the release coating may be a solvent-swellable material in which, during the removal of the deposited material, the coating swells under the action of the solvent, disrupting the layer of deposited material causing the release thereof.

Thus, suitable release coatings include those materials which can be embossed and are easily solubilized and on which the particulate-forming material may be deposited. Examples of such release coatings include polymers, such as polyvinyl chloride, vinyl chloride-vinyl acetate copolymer, polystyrene, styrene copolymers (including styrene-maleic anhydride copolymers and acrylonitrile-butadiene-styrene copolymers), chlorinated rubber, nitrocellulose, methyl methacrylate, acrylic copolymers, fatty acids, waxes, gums, gels and mixtures thereof. In addition, up to 5% of a non-stick additive, such as silicon oil or fatty acid salt, may be added. A plasticizer may be added to the release layer, as is conventional in the art. Application of the release coating can be performed by solubilizing the coating material in a suitable solvent and applying the resulting liquid with a standard continuous roll coating machine equipped to apply uniform thin coatings at commercially suitable speeds of 150 to 500 metres per minute on one or both sides. The coated carrier sheet is preferably dried until the solvents are removed. The coating may be carried out according to conventional coating techniques known in the art and with conventional apparatus, for instance rotogravure coater equipped with roll-to-roll unwind/wind system (e.g. the Two Position Rotogravure Coater and Drying Tunnel (Inta-Roto Inc.; Virginia; US)).

In a preferred embodiment, the release coating is selected from the release coating described in EP-0906362-A, the disclosure of which release coatings is incorporated herein by reference. Thus, in one embodiment, the release layer is derived from a water-soluble low molecular weight styrene copolymer. By low molecular weight is meant from about 700 to about 10,000 (weight average). The copolymer comprises one or more styrene monomer and one or more monomers of an alpha, beta-unsaturated carboxylic acid or cyclic dicarboxylic acid anhydride, preferably maleic anhydride. The copolymer is preferably selected from styrene/maleic anhydride polymer or styrene/acrylic polymer or blends thereof. Preferably, the copolymers comprise alternating units of styrene and comonomer, or are non-equimolar copolymers containing less than about 50 mole percent of the comonomer. The styrene may be replaced in whole or in part by other vinylaromatic monomers including substituted styrenes such as alpha-methylstyrene, nuclear methylstyrenes, ethylstyrene, isopropylstyrene, t-butylstyrene, chlorostyrene, dichlorostyrene, bromostyrene, and dibromostyrene. Other alpha, beta-unsaturated cyclic dicarboxylic acid anhydrides include itaconic, aconitic, citraconic, mesaconic, chloromaleic, bromomaleic, dichloromaleic, dibromomaleic, phenylmaleic and the like. The polymer may also contain a termonomer such as 1-3 carbons alkyl acrylate or methacrylate, acrylonitrile, methacrylonitrile, acrylamide, methacrylamide, acrylic acid or methacrylic acid. Suitable styrene/acrylic copolymers have a weight average molecular weight from about 3,000 to about 10,000, for instance the CARBOSET® resins available from BF Goodrich Company, such as GA-1931 and GA-1161.

The final dry coating thickness of a release coating typically ranges from about 10 to about 100 nm, preferably from about 20 to about 50 nm.

Embossing Process

In Embodiment A, the repeat pattern is produced by subjecting the substrate to elevated temperature and pressure under stamping dies or by rotary embossing. This thermo-embossing process is conducted at elevated temperature, that is to say at a temperature above ambient temperature and typically above the Tg of the embossable material. In one embodiment, the thermo-embossing process is conducted at a temperature of from about 40 to 200° C., preferably 50 to 150° C., preferably 60 to 120° C. The embossed relief pattern must be retained in the substrate during subsequent processing and storage, and therefore suitable embossable materials are limited to those which exhibit a Tg significantly above room temperature, preferably at least 40° C., preferably at least 50° C., preferably at least 60° C., and in one embodiment at least 80° C.

The substrate is forcibly contacted with the surface of the shim carrying the desired relief, i.e. the repeat pattern comprising the negative image of the desired cell structure and the optional micro-relief pattern such as a diffraction grating or holographic image pattern. Typically, the film is contacted with an embossing drum (or belt) against which it is urged by a further roller, and the surface structure of the embossing drum is transferred into the resin.

In Embodiment B, the essential features of the embossing step are the same as described for Embodiment A. The curable material may be cured, for instance by exposure to radiation, at the same time as embossing and/or following embossing. If the embossing drum is transparent (as described in, for instance, WO-94/18609-A) then radiation curing can be carried out through the drum surface. If the support layer is transparent then radiation curing can be carried out from the side of the substrate remote from the curable layer. Curing may be conducted at elevated temperature, and preferably no more than about 50° C., and is preferably conducted at ambient temperature.

Deposition and Stripping Process

After the embossed surface is formed, the substrate is coated with the material which will eventually form the particles. The deposited material from which the particles are made may be any suitable organic or inorganic material. Typically, the material is a high refractive index (HRI) material. The term "inorganic material" as used herein includes metallic and ceramic materials. Suitable metals include aluminium, chromium, copper, zinc, silver, gold, titanium, tin, platinum, palladium, nickel, cobalt, rhodium, niobium, and compounds, combinations or alloys thereof. Suitable alloys include steel or Nichrome, and other inert alloys. Suitable inorganic compounds include metal nitrides, carbides, oxides, sulphides, fluorides and borides, such as titanium nitride, titanium carbide, vanadium carbide, titanium dioxide, indium tin oxide (ITO) and zinc sulphide, and combinations thereof. Other HRI materials and materials which can be deposited via the deposition methods mentioned hereinbelow can also be used.

The deposited material preferably comprises one layer, but it may also comprise multiple layers, for instance as described in WO-A-03/011980 (Flex Products, Inc.), the disclosure of which multilayer materials and methods for the production therefor are incorporated herein by reference. Thus, the deposited material may comprise a reflective layer, for instance a reflective layer composed of the metallic materials or alloys noted above although non-metallic reflective layers may also be used, and on one or both surfaces thereof a diffractive layer which may be composed of a dielectric material. The dielectric material is typically substantially transparent, and preferably has a refractive index of about 1.65 or less, preferably about 1.5 or less, and may comprise for instance magnesium fluoride, silicon dioxide, aluminium oxide, aluminium fluoride, cerium fluoride, lanthanum fluoride, neodymium fluoride, samarium fluoride, barium fluoride, calcium fluoride and lithium fluoride, and combinations thereof. In a further embodiment, the deposited material may comprise a dielectric layer and on one or both surfaces thereof a reflective layer, and optionally with further substantially transparent dielectric layer(s) overlaid over the reflector layer(s). In this embodiment, the core dielectric layer is preferably inorganic, and preferably selected from metal fluorides, oxides, sulphides, nitrides, carbides and the like, and combinations thereof, and suitable compounds include magnesium fluoride, silicon monoxide, silicon dioxide, aluminium oxide, titanium dioxide, tungsten oxide, aluminium nitride, boron nitride, boron carbide, tungsten carbide, titanium carbide, titanium nitride, silicon nitride, zinc sulphide and the like.

The thickness (T) of the deposited material naturally determines the thickness of the particles or platelets produced by the present invention. The thickness of the deposited film is important to obtain particles having desirable optical properties, such as brightness. To obtain the desired continuous reflectivity of aluminium particles, for instance, the preferred thickness is from 15 to 45 nm. The optimum thickness will vary depending on the material used. The thickness (T) may be and preferably is in the range from about 10 nm to about 1 µm, typically from about 10 nm to about 750 nm, typically from about 10 nm to about 500 nm, typically no more than 150 nm, more typically no more than 100 nm, and in one embodiment in the range of 10 nm to 50 nm, more preferably in the range of 15 mm to 50 nm. In one embodiment, the film thickness is highly uniform. In one embodiment, the thickness (T) may be taken as the thickness in a region where any additional micro-relief pattern is not present, and typically such a region is found towards the edges of the cell (i.e. when the additional micro-relief pattern is disposed centrally in the cell floor).

The thickness (T) of the deposited material is correlated with the height ($H_W$) of the cell walls and typically also with the height (h) of the additional relief pattern.

In the embodiment where the cell walls define a positive relief pattern, the material is deposited to a thickness (T) which is less than or equal to the height ($H_W$) of the cell walls. If the thickness (T) is greater than ($H_W$), then it becomes harder to achieve fracture between the deposited material in adjacent cells, and therefore harder to prepare single particles. In this embodiment, the ratio ($H_W$:T) is preferably in the range of 1:1 to 10:1, and is preferably greater than 1:1, and typically about 5:1.

Similarly, in the embodiment where the cell walls define a negative relief pattern, the relationship between the thickness (T) of the deposited material and $H_W$ is also important in order to facilitate fracture of the deposited material during the stripping (and optional comminution) step. In this embodiment also, $H_W$ is greater than or equal to (T) to facilitate fracture. Preferably, the ratio ($H_W$:T) is in the range of 1:1 to 10:1, and typically about 5:1.

If (h) is greater than (T), particularly wherein the additional relief pattern forms positive relief in the cell floor of the laminar substrate and therefore negative relief (i.e. indentations) in the particles, the mechanical integrity of the particles may be reduced, and therefore the ratio (T:h) is preferably in the range of 1:1 to 10:1, and is preferably greater than 1:1. As is evident in FIG. 3, the values of (h) and (T) can be similar since the amount of material deposited in the regions of the additional micro-relief pattern is approximately the same as the amount of material deposited in the regions of the cell where there is no additional micro-relief pattern.

Suitable techniques for deposition of material onto the patterned substrate are well-known to the skilled person and will depend on the material to be deposited. Suitable techniques include sputtering, vacuum deposition, chemical vapour deposition (CVD), electroplating, sol-gel techniques, precipitation from a liquid, flame-spraying and the like.

In the case of inorganic particles, the substrate is typically passed through a vacuum deposition or sputtering machine and a film is deposited on one or both sides of the substrate. The thickness of the deposited film is controlled by the speed of the web and the power required for the evaporation rate. The vaporization of the inorganic material is carried out using conventional methods, such as induction, resistance, electron beam and sputtering.

Sputtering may be effected according to conventional techniques in the art, including reactive sputtering. Sputtering is a well-known technique for the deposition of thin film coatings, and has a number of variations. In its basic form, a solid target, containing one or more of the elements in the chemical makeup of the desired thin film, is bombarded with energetic ions of a sputtering gas (usually an inert gas such as argon). These energetic ions are capable of physically removing atoms from at least part of the target surface. The target is normally contained in a chamber, firstly evacuated to an initial pressure for the removal of air and water vapour and subsequently backfilled with inert gas to a working pressure. The atoms removed (sputtered) from the target are free to travel distances of at least several centimetres in the reduced pressure of the chamber without losing too much energy through collisions with other gas atoms/molecules. At least some of the sputtered atoms arrive at a substrate, where at least some of them adhere and form a thin film coating. The process is continued until the desired thickness of the thin film coating is obtained. Multiple targets and multiple power supplies may be used to increase deposition rates or to ensure uniformity. In magnetron sputtering, a magnetic field created behind the target increases the level of ionisation of the sputtering gas, increasing the removal rate of atoms from the target and decreasing the time necessary to obtain a given coating thickness. In reactive sputtering, a reactive gas, such as oxygen and/or nitrogen, is introduced into the chamber, in addition to, or instead of the sputtering gas. In the case of nitrides, the reactive gas may be nitrogen, or may be butane in the case of carbides. The reactive gas combines with the sputtered material to form a compound thin film such as an oxide, nitride or oxynitride layer on the substrate. In its most common embodiment, a solid elemental target is used with a sputtering gas and a reactive gas (for example a solid aluminium target may be sputtered by argon in the presence of oxygen to form an aluminium oxide). Reactive sputtering is preferred for inorganic compounds such as titanium carbides and other ceramics.

The coated substrate is then ready for the separation or release of the deposited material from the embossed substrate.

In the preferred embodiment described herein, the coated substrate is passed into a solvent tank containing the solvent in which the release coating is solubilized. Suitable solvents include acetone, water, alcohols, chlorinated solvents such as methylene chloride, methyl ethyl ketone, methyl isobutyl ketone, toluene, butyl acetate and the like, and mixtures thereof, provided that the solvent is not reactive to the deposited material. The coated substrate is typically passed over a series of rollers and past an air knife or a suitable wiper which removes loose deposited particles from the substrate. The air knife may be in the solvent tank but usually is in a separate chamber containing a solvent, which solvent may be the same solvent as in the initial solvent tank. A suitable air knife can be formed from a hollow tube fitted to a source of compressed air (typically supplied at a pressure of about 90 psi). Nozzles or fine holds are machined laterally and equally spaced along its length so when assembled the air jets project at a tangent to the moving substrate. The air jets remove any residual particles remaining on the surface of the substrate. The air knife also acts as a drying mechanism for the wetted substrate thereby aiding in rewinding. In addition it may be desirable to use a vapour degreasing technique to totally remove both residual deposited material and release coating from the substrate prior to rewinding. The vapour degreasing also cleanses any residual release coating from any remaining particulate material. The air may be at ambient temperature, chilled or heated for optimum efficiency.

Ultrasonic agitation may be used alone or in conjunction with other techniques in the stripping process to facilitate or improve release, and in the preferred embodiment described herein, ultrasound agitation is used in conjunction with the solvent stripping process.

The solvent in the solvent tank may be used until saturated. The solvent may then be recovered from the solution containing the coating material. The coating material can be reused in a subsequent coating operation if it is properly purified.

The stripping procedure may optionally comprise a comminution step to facilitate fracture of the deposited material into individual particles of dimensions corresponding to the discrete cells on the laminar substrate. Particularly in the embodiment where the cell walls of the laminar substrate define negative relief in the z-direction, comminution is highly desirable in order to facilitate the fracture of a raft of deposited material into individual particle along the fracture lines corresponding to the pattern of the cell walls in the laminar substrate. Comminution may be achieved using any suitable method, for instance ultrasonic agitation, mechanical agitation or other method involving a shear force to encourage flexing and therefore fracture of the raft of deposited material.

Solvent transfer techniques may be used in the stripping and subsequent processing of the deposited material. Thus, different solvents may be used for the stripping step, the comminution step and further downstream processing step.

The coating material dispersed in the solvent is either allowed to settle in a stripping tank or passed (typically by pump) to one or more settling tanks. Alternatively, the dispersion may be passed through a centrifuge or hydrocyclone to obtain a concentrated suspension. The particulate material comprises particles having dimensions corresponding to those of the discrete cells. The particulate material may then be concentrated to produce a composition having the desired amount of solids by weight, typically from about 5 to about 15%. The concentrated pigment may then be formulated into a paint, lacquer or printing ink, as desired.

In one embodiment, the deposited material is stripped from the substrate by heat-treatment or calcination, as noted above, which involves a densification of the deposited material.

According to a further aspect of the invention, there is provided a composite film comprising a polyester support layer (particularly PET) having a first and second surface, a copolyester thermo-embossable layer on a first surface of the support, and a solvent-strippable release coating (preferably derived from a water-soluble low molecular weight styrene copolymer as defined herein), wherein said release coating is disposed on the surface of the thermo-embossable layer opposite to the support layer, particularly wherein:
(i) said copolyester comprises ethylene glycol and terephthalic acid and one or more further comonomers; or
(ii) said copolyester is derived from an aliphatic glycol (preferably ethylene glycol) and at least two dicarboxylic acids, particularly aromatic dicarboxylic acids, preferably terephthalic acid and isophthalic acid, preferably wherein the molar ratio of terephthalic acid to isophthalic acid is in the range of from 50:50 to 90:10, preferably in the range from 65:35 to 85:15, and is preferably about 82:18.

According to a further aspect of the invention, there is provided the use of the aforementioned composite film as a substrate in the manufacture of particles of controlled dimensions as defined herein.

In a further aspect of the invention, there is provided a process for the preparation of an embossed film characterised in that the embossed film is a laminar substrate having a patterned surface comprising a micro-relief repeat pattern comprising one or more discrete cells, each cell consisting of a floor portion and walls having a height ($H_W$), said process comprising the steps of providing an embossable substrate and embossing the embossable substrate with said repeat pattern wherein:
(i) the height ($H_W$) of said cell walls is in the range of 10 nm to 50 nm; and/or
(ii) at least 80% of the surface area in the x-y plane of the patterned surface of the laminar substrate is constituted by said floor portions of said cells; and/or
(iii) said process further comprises the step of depositing a layer of inorganic or organic material such that said deposited material has a thickness (T) such that $T \leq H_W$.

In a further aspect of the invention, there is provided an embossed film characterised in that the embossed film is a laminar substrate having a patterned surface comprising a micro-relief repeat pattern comprising one or more discrete cells, each cell consisting of a floor portion and walls having a height ($H_W$), wherein:
(i) the height ($H_W$) of said cell walls is in the range of 10 nm to 50 nm; and/or
(ii) at least 80% of the surface area in the x-y plane of the patterned surface of the laminar substrate is constituted by said floor portions of said cells; and/or
(iii) said embossed film further comprises a layer of deposited inorganic or organic material wherein said deposited material has a thickness (T) such that $T \leq H_W$.

In a further aspect of the present invention, there is provided a particle which is a platelet exhibiting a planar geometry made up of a number (x) of planar (y)-sided polygon(s), wherein x is from 1 to 20 and y is at least 3 wherein if x is greater than 1 then said planar (y)-sided polygons are fused along one or more sides thereof, wherein the width ($W_P$) of the platelet (P) at its widest point is no more than about 250 μm and the thickness of said platelet is in the range of 10 mm to 50 nm, and optionally wherein said platelet carries a micro-relief pattern on a surface thereof (that is to say that the platelet carries the additional micro-relief pattern referred to hereinabove).

In a further aspect of the present invention, there is provided a composition comprising a plurality of particles (P), wherein the number (n) of particles in said composition is at least 10, wherein said particles (P) are platelets exhibiting a planar geometry made up of a number (x) of planar (y)-sided polygon(s), wherein x is from 1 to 20 and y is at least 3, and wherein if x is greater than 1 then said planar (y)-sided polygons are fused along one or more sides thereof, wherein the width ($W_P$) of the platelets at their widest point is no more than about 250 μm and the thickness of the platelets is in the range of 10 nm to 50 nm. Such particles are referred to herein as the "non-encoded particles" of controlled dimensions.

In a further aspect of the present invention, there is provided a composition comprising a plurality of particles (P), wherein the number (n) of particles in said composition is at least 10, wherein said particles (P) are platelets exhibiting a planar geometry made up of a number (x) of planar (y)-sided polygon(s), wherein x is from 1 to 20 and y is at least 3 wherein if x is greater than 1 then said planar (y)-sided polygons are fused along one or more sides thereof, wherein the width ($W_P$) of the platelets at their widest point is no more than about 250 μm and the thickness of the platelets is in the range of 10 nm to 50 nm, and wherein said platelets carry one or more micro-relief pattern(s) on a surface thereof. Such particles are referred to herein as the "encoded particles" of controlled dimensions.

In a further aspect of the present invention, there is provided a composition comprising both the encoded and non-encoded particles of controlled dimensions as defined herein. Thus, in this aspect there is provided a composition comprising a plurality of particles (P), wherein the number (n) of particles in said composition is at least 10, wherein said particles (P) are platelets exhibiting a planar geometry made up of a number (x) of planar (y)-sided polygon(s), wherein x is from 1 to 20 and y is at least 3 wherein if x is greater than 1 then said planar (y)-sided polygons are fused along one or more sides thereof, wherein the width ($W_P$) of the platelets at their widest point is no more than about 250 μm and the thickness of the platelets is in the range of 10 nm to 50 um, wherein a proportion ($E_1$) of said platelets carry one or more micro-relief pattern(s) on a surface thereof, wherein $0 < E_1 < 100\%$.

In a further aspect of the present invention, there is provided a composition comprising non-encoded and/or encoded particles of controlled dimensions as defined herein and manufactured as described hereinabove, and further comprising conventional particles manufactured using a technique other than the discrete cell technique described herein. Thus, in this aspect there is provided a composition comprising a plurality of particles (P), wherein the number (n) of particles in said composition is at least 10, wherein said particles (P) are platelets exhibiting a planar geometry made up of a number (x) of planar (y)-sided polygon(s), wherein x is from 1 to 20 and y is at least 3 wherein if x is greater than 1 then said planar (y)-sided polygons are fused along one or more sides thereof, wherein the width ($W_P$) of the platelets at their widest point is no more than about 250 μm and the thickness of the platelets is in the range of 10 nm to 50 nm, optionally wherein a proportion ($E_2$) of said platelets carry one or more micro-relief pattern(s) on a surface thereof wherein $0 < E_2 \leq 100\%$, and further comprising conventional particles manufactured using a technique other than the discrete cell technique described herein. In this aspect of the invention, the conventional particles may be encoded or non-encoded or be a mixture thereof.

In a further aspect of the present invention, there is provided a particle which is a substantially circular platelet of diameter (d), wherein the diameter (d) of the platelet at its widest point is no more than about 250 μm and the thickness of said platelet is in the range of 10 nm to 50 nm, optionally wherein said platelet carries a micro-relief pattern on a surface thereof (that is to say that the platelet carries the additional micro-relief pattern referred to hereinabove). In a further aspect, there is provided a composition comprising a plurality of particles (P), wherein the number (n) of particles in said composition is at least 10, wherein said particles (P) are substantially circular platelets of diameter (d) wherein the diameter (d) of the platelet at its widest point is no more than about 250 μm and the thickness of said platelet is in the range of 10 nm to 50 nm, and optionally wherein a proportion ($E_2$) of said platelets carry one or more micro-relief pattern(s) on a surface thereof wherein $0 < E_2 \leq 100\%$, i.e. wherein said composition comprises the non-encoded and/or encoded particles as referred to herein, and wherein said composition optionally further comprises conventional particles manufactured using a technique other than the discrete cell technique described herein. Equally, the present invention provides similarly defined particles which are oval or have a pre-determined combination of linear edges and curved edges, and compositions thereof.

Preferably, n is at least 100, preferably at least 1000, and preferably at least $10^4$. Typically, however, the present invention is utilised for manufacturing particles for incorporation into paints and the like, which will comprise at least a million, and normally several millions or even billions of said particles in a given sample, depending on the concentration of the particles obtainable by the present invention in the composition or formulation which is eventually utilised by the end-user.

Preferably, x is in the range from 1 to 10, preferably in the range of 1 to 5, preferably in the range from 1 to 4, preferably in the range from 1 to 3, preferably 1 or 2, and preferably x is 1.

Preferably, y is 3 to 20, preferably 3 to 10, preferably 3 to 8, preferably 3 to 6, and preferably 3, 4 or 6.

The dimensions of the particles correspond to the dimensions of the discrete cells in the micro-relief pattern, as defined above. Thus, the dimensions of the planar (y)-sided polygon defined by the platelets (P) correspond to those of a set of similar discrete cells of the patterned surface of the laminar substrate, which have a width ($W_C$) at their widest point of no more than about 250 μm, preferably no more than about 100 preferably from about 5 to about 100 μm, preferably from about 5 to about 50 μm. Thus, the dimensions of the platelets (P), for instance the planar (y)-sided polygon defined by the platelets (P), are such that the width ($W_P$) of the platelets (P) at their widest point is no more than about 250 μm, preferably no more than about 100 μm, preferably from about 5 to about 100 μm, preferably about 5 to about 50 μm.

The thickness of the particles or platelets according to the present invention is in the range of 10 μm to 50 nm, and preferably in the range of 15 nm to 50 nm. In one embodiment, the thickness is highly uniform. In one embodiment, the thickness (T) of the particles or platelets may be taken as the thickness in a region where any additional micro-relief pattern is not present, and typically such a region is found towards the edges of the particle or platelet (i.e. when the additional micro-relief pattern is disposed centrally in the cell floor). In such a region, the thickness of the platelet corresponds approximately with the thickness of the deposited material. The thickness of a platelet which carries an additional micro-relief pattern is not necessarily uniform over its laminar surface area and will typically appear thicker in the region of the additional micro-relief pattern (see FIG. 3), although the amount of deposited material per unit area across the whole of the platelet is approximately the same.

In the composition of particles (P) defined hereinabove, the platelet particles (P) derived from a set of similar discrete cells are highly uniform in dimension, and particularly wherein x=1, preferably exhibit a particle size distribution such that at least 50% by number, preferably at least 75% by number, preferably at least 90% by number, preferably at least 95% by number, preferably at least 99% by number, and preferably substantially all of said particles (P) have a width which is $W_P$±10%, preferably $W_P$±5%, and more preferably $W_P$±1%. Thus, the present invention is particularly suitable for the provision of a monodisperse composition of particles, in which all the particles are essentially of the same dimension.

In one embodiment, said composition comprises two or more different types of particles as defined above, for instance, particles $P_1$ and $P_2$ etc., and in this embodiment each type of particle may be defined with reference to the parameters (n), (x) and (y), each of which may be the same or different, to provide a composition defined by parameters $n_1$, $x_1$, $y_1$, $n_2$, $x_2$, $y_2$ etc. In this embodiment, the particles $P_1$ and $P_2$ etc. may comprise planar geometries where $y_1=y_2$ etc. such that the only difference between the types of particles is the number ($n_1$, $n_2$ etc.) of each particle type, and the degree of fusion (i.e. the value of $x_1$, $x_2$ etc) thereof, thereby defining a bimodal distribution (for 2 particle types) or trimodal distribution (for 3 particle types) etc. In such a particle distribution, preferably one of said types of particle ($P_1$) exhibits $x_1=1$, preferably wherein the value of $n_1$ is at least 30%, preferably at least 40%, preferably at least 50%, preferably at least 60%, preferably at least 70%, preferably at least 80%, preferably at least 90%, and preferably at least 95% of the total number of particles ($n_1+n_2 \ldots n_i$ where there are i different types of particle). Alternatively, the particles $P_1$ and $P_2$ etc. may comprise planar geometries based on different (y)-sided polygons.

According to a further aspect of the invention, there is provided a composition of particles with controlled dimensions obtainable by a process comprising the steps of:
(i) providing a laminar substrate having a patterned surface comprising a micro-relief repeat pattern comprising one or more discrete cells, each cell consisting of a floor portion and walls having a height ($H_W$);
(ii) depositing organic or inorganic material onto the patterned surface and into the cells to provide a thickness (T) of the deposited material wherein T≤$H_W$;
(iii) stripping the deposited organic or inorganic material from the surface of the substrate; and
(iv) collecting the particles formed from said organic or inorganic material.

The composition of particles (P) as defined herein may further comprise other particles or components (such as conventional pigment particles) and the concentration of particles (P) varied as required. These conventional particles may have a chemical composition which is the same as or different to the encoded and/or non-encoded particles of controlled dimensions described herein.

According to a further aspect of the present invention, there is provided a formulation comprising the composition of particles (P) as defined herein, and further comprising a vehicle, carrier, medium or diluent. Any suitable vehicle, carrier, medium or diluent conventional in the end-use or application of interest may be used to prepare the formulation. The formulation comprising particles (P) may comprise conventional particles, such as conventional pigment particles.

The compositions and formulations comprising particles (P) of this invention may be in the form of a pigment concentrate. This pigment concentrate may be used to prepare pigmented coatings, inks and paints. The terms pigmented coatings, inks and paints as used herein include formulations which contain the particles of the present invention as a pigment in sufficient concentration for the formulation to be opaque, but also includes formulations which are optically transparent or translucent and which contain only low levels of particles as pigment. Examples of pigmented formulations according to the present invention include paints, lacquers, coatings printing inks (such as an ink jet printing ink), cosmetics, glazing frits and ceramic frits.

The compositions and formulations of particles (P) obtained via this invention may also be added to polymer materials, including polymer masterbatches, and coloured plastic articles made therefrom.

Security pigments and security compositions are of particular interest. By reference to a "security pigment" or "security composition", we mean any pigment or composition which can be used to verify or authenticate the origin of goods or services, or which can be used to carry information. By virtue of the micro-relief pattern(s) carried on the particles, the particles, compositions and formulations of the present invention can carry retrievable information such as a logo, machine-readable image (such as a bar-code), alphanumeric sequence or some other form of code or fingerprint, and are therefore suitable for use in security applications. Indeed, the size, shape and particle size distribution of the composition of particles (P) described herein can also function to verify or authenticate the origin of the goods or services. The dimensions of the particles and the micro-relief pattern(s) thereon mean that the information held by the particles is difficult to access and reproduce without specialist equipment. The present invention therefore has wide-ranging applications in security applications, such as counterfeiting and fraud detection methods, and could be used in for example banknotes, passports and identity cards, certificates, entry cards, bank and credit cards, packaging, labels for high quality goods and any other security device in an application in which it is required to encode security information or in which the origin of goods or services is of importance and/or value. For instance, the present invention has the capability to capture information about the time, date and place of manufacture of an article and can therefore find application in "track and trace" methods. Goods in which the present invention may find application include motor vehicles and parts therefor, household appliances and other electrical goods, building materials and architectural structures, sporting goods, fabrics, ceramics, cosmetics and beverages and the like.

According to a further aspect of this invention, there is provided a security or anti-counterfeit device that comprises a composition or formulation as defined herein comprising a plurality of particles (P).

According to a further aspect of this invention, there is provided the use of a composition or formulation as defined herein comprising a plurality of particles (P), as or in a security pigment or security composition.

According to a further aspect of the invention there is provided a method of storing security information, the method comprising the steps of:
(i) providing a laminar substrate, or a means to manufacture a laminar substrate, said laminar substrate having a patterned surface comprising a micro-relief repeat pattern comprising one or more discrete cells wherein each cell consists of a floor portion and walls having a height ($H_W$), and optionally wherein the repeat pattern comprises an additional micro-relief pattern in the floor portion of the cell;
(ii) depositing organic or inorganic material onto the patterned surface and into the cells to provide a thickness (T) of the deposited material wherein $T \leq H_W$;
(iii) optionally stripping the deposited organic or inorganic material from the surface of the substrate; and
(iv) optionally collecting the particles formed from said organic or inorganic material, wherein said security information subsists in the dimensions of said discrete cells and/or in said additional micro-relief pattern.

According to a further aspect of the invention there is provided a method of marking goods or services with security information, the method comprising the steps of applying a composition or formulation comprising particles (P) as defined herein to an article associated with said goods or services, wherein said security information subsists in the dimensions of said particles and/or in a micro-relief pattern thereon.

According to a further aspect of the present invention there is provided a method of verifying or authenticating the origin of goods or services, said method comprising the steps of: (i) applying a composition or formulation comprising particles (P) as defined herein to an article associated with said goods or services, and (ii) identifying the presence or absence of said particles in an article associated with said goods or services. Of course, in step (i) of this method, the "article associated with said goods or services" is of certain origin, whereas in step (ii) the "article associated with said goods or services" is of uncertain origin and needs to be verified or authenticated.

The present invention therefore provides a method of protecting goods or services against counterfeiting or fraud.

The following test methods may be used to characterise the polymeric film:
(i) Wide angle haze is measured using a Hazegard System XL-211, according to ASTM D 1003-61.
(ii) Particle size was measured by an optical microscope for analysis of the x-y dimension; and by AFM (atomic force microscopy) for the thickness (z) dimension.

BRIEF DESCRIPTION OF THE DRAWINGS

The invention is illustrated with reference to the following Figures.

FIG. 1A illustrates the embodiment were the cell walls define positive relief in the z-dimension. FIG. 1B illustrates the embodiment were the cell walls define negative relief in the z-dimension. FIG. 1C illustrates the embodiment were the cell walls define both positive and negative relief in the z-dimension relative to the x-y plane of the cell floor.

DETAILED DESCRIPTION

The invention is further illustrated by the following examples. It will be appreciated that the examples are for illustrative purposes only and are not intended to limit the invention as described above. Modification of detail may be made without departing from the scope of the invention.

EXAMPLES

Example 1

A polymer composition comprising polyethylene terephthalate was coextruded with a copolyester comprising terephthalic acid/isophthalic acid/ethylene glycol (82/18/100), cast onto a cooled rotating drum and stretched in the direction of extrusion to approximately 3 times its original dimensions at a temperature of approximately 90° C. The film was then passed through an inter-draw coater where a release coating comprising partially-esterified styrene maleic anhydride was applied as an aqueous solution at a concentration of 7% solids to one side of the film by a reverse roll direct coater. The coater speed was between 7 and 11 m·min$^{-1}$ and the line-speed was between 10 and 15 m·min$^{-1}$ The film was passed into a stenter oven at a temperature of 100° C. where the film was stretched in the sideways direction to approximately 3 times its original dimensions. The biaxially-stretched film was heat-set at a temperature of about 230° C. by conventional means. The total thickness of the coextruded film was 50 μm; the copolyester layer being approximately 10 μm thick, and the release coating being approximately 60 to 80 nm thick.

The substrate was then heated to a temperature within the range 104 to 106° C. and pressed against an embossed roller (shim) bearing a repeat pattern comprising discrete cells of either regular hexagons, triangles or squares, the maximum planar dimension of a discrete cell being 25 μm between opposite walls. The depth of the negative image of the cell walls on the shim (prepared by electron-beam etching) was either 250 nm, 325 nm or 450 nm. The floor portion of each cell was coplanar with the surface of the support layer.

A4 samples were then taken from the embossed reels and metallised in an Edwards laboratory scale bell jar metalliser, applying an aluminium film layer to a thickness in the range of 20 to 50 nm. The metallised film was then passed through a solvent-stripping process. The solvent used in the stripping process was acetone. The samples were either manually shaken or ultrasonically agitated, and the metal flakes were stripped from the film in about 30 seconds. A suspension of aluminium particles was collected having a concentration of about 1% by weight of aluminium particles. Optical magnification of the particles demonstrated that at least 30% of the particles exhibited the regular geometry of the cell pattern on the shim, i.e. were single hexagons, triangles or squares (x=1), and about 30% of the particles were particles consisting of fused hexagons, triangles or squares where the degree of fusion was x=2 or 4.

What is claimed is:

1. A particle of controlled dimensions, consisting essentially of a platelet exhibiting a planar geometry which is circular or which is made up of a number (x) of planar (y)-sided polygon(s), wherein x is from 1 to 20 and y is at least 3 wherein if x is greater than 1 then said planar (y)-sided polygons are fused along one or more sides thereof, wherein the width (Wp) of the platelet (P) at its widest point is no more than about 250 μm and the thickness of said platelet is in the range of 10 nm to 50 nm.

2. A particle according to claim 1, wherein said platelet carries one or more micro-relief patterns on a surface thereof.

3. A particle according to claim 2, wherein said one or more micro-relief patterns is an optically variable effect structure.

4. A particle according to claim 1 wherein x is in the range from 1 to 10.

5. A particle according to claim 1 wherein y is 3 to 20.

6. A composition comprising a plurality of particles (P) of controlled dimension, wherein the number (n) of particles in said composition is at least 10, wherein said particles (P) consist essentially of platelets exhibiting a planar geometry which is circular or which is made up of a number (x) of planar (y)-sided polygon(s), wherein x is from 1 to 20 and y is at least 3 wherein if x is greater than 1 then said planar (y)-sided polygons are fused along one or more sides thereof, wherein the width (Wp) of the platelets (P) at their widest point is no more than about 250 μm and the thickness of the platelets (P) is in the range of 10 nm to 50 nm.

7. A composition according to claim 6 wherein x is in the range from 1 to 10.

8. A composition according to claim 6 wherein y is 3 to 20.

9. A composition according to claim 6, which is a pigment, security pigment, pigment concentrate, polymer masterbatch, paint, lacquer, coating, printing ink, glazing frit, ceramic frit, or security composition or concentrates therefor.

10. A formulation comprising the composition as defined in claim 6, and further comprising a vehicle, carrier, medium or diluent.

11. A formulation according to claim 10, which is a pigment, security pigment, pigment concentrate, polymer masterbatch, paint, lacquer, coating, printing ink, glazing frit, ceramic frit, or security composition or concentrates therefor.

12. A platelet consisting essentially of a planar geometry which is circular or which is made up of a number (x) of planar (y)-sided polygon(s), wherein x is from 1 to 20 and y is at least 3 wherein if x is greater than 1 then said planar (y)-sided polygons are fused along one or more sides thereof, wherein the width (Wp) of the platelet (P) at its widest point is no more than about 250 μm and the thickness of said platelet is in the range of 10 nm to 50 nm, said platelet carrying one or more micro-relief patterns on a surface thereof.

* * * * *

UNITED STATES PATENT AND TRADEMARK OFFICE
CERTIFICATE OF CORRECTION

PATENT NO. : 9,850,385 B2
APPLICATION NO. : 14/815730
DATED : December 26, 2017
INVENTOR(S) : Szuscik-Machnicki et al.

It is certified that error appears in the above-identified patent and that said Letters Patent is hereby corrected as shown below:

On the Title Page

Item (57), in the Abstract, Lines 8-9, please change "250 pm" to --250 µm--.

In the Specification

Column 8, Line 23, please change "(WO" to --($W_C$)--.

Column 23, Line 29, after "100" insert --µm,--.

Column 23, Line 38, please change "µm" to --nm--.

Signed and Sealed this
Twenty-fourth Day of July, 2018

Andrei Iancu
*Director of the United States Patent and Trademark Office*